United States Patent
Martin et al.

(10) Patent No.: US 10,562,229 B2
(45) Date of Patent: Feb. 18, 2020

(54) DETERMINING THE UNIFORMITY OF POWDER LAYER DISTRIBUTION ACROSS THE BUILD PLATE DURING A POWDER BED FUSION PROCESS

(71) Applicant: Hamilton Sundstrand Corporation, Charlotte, NC (US)

(72) Inventors: Thomas J. Martin, East Hampton, CT (US); Alexander Staroselsky, Avon, CT (US); Sergey Mironets, Charlotte, NC (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 222 days.

(21) Appl. No.: 15/629,991

(22) Filed: Jun. 22, 2017

(65) Prior Publication Data
US 2018/0370142 A1    Dec. 27, 2018

(51) Int. Cl.
| | |
|---|---|
| *G01N 21/95* | (2006.01) |
| *G01N 25/02* | (2006.01) |
| *G05B 19/4099* | (2006.01) |
| *B29C 64/386* | (2017.01) |
| *B29C 64/393* | (2017.01) |
| *B29C 64/153* | (2017.01) |
| *G06T 7/00* | (2017.01) |

(Continued)

(52) U.S. Cl.
CPC .......... *B29C 64/386* (2017.08); *B22F 3/1055* (2013.01); *B29C 64/153* (2017.08); *B29C 64/393* (2017.08); *G01J 5/602* (2013.01); *G06T 7/0004* (2013.01); *G01J 2005/0081* (2013.01); *G06T 2207/10048* (2013.01)

(58) Field of Classification Search
CPC ... B22F 3/1055; B29C 64/153; B29C 64/386; B29C 64/393; B33Y 10/00; B33Y 50/00; B33Y 50/02; G01J 5/602; G01J 2005/0081; G01N 21/95; G01N 25/02; G05B 19/4099; G06T 7/0004; G06T 2207/10048
USPC ........................ 264/406, 408, 409, 410, 497; 219/121.64, 121.66, 121.83, 121.85; 356/43
See application file for complete search history.

(56) References Cited

U.S. PATENT DOCUMENTS

| | | | |
|---|---|---|---|
| 8,160,296 | B2 | 4/2012 | O'Hara et al. |
| 9,551,616 | B2 | 1/2017 | McQuilkin et al. |

(Continued)

FOREIGN PATENT DOCUMENTS

| | | |
|---|---|---|
| DE | 102007056984 A1 | 5/2009 |
| EP | 1466718 | 10/2004 |

(Continued)

OTHER PUBLICATIONS

European Search Report for International Application No. 181790635-1103, dated Oct. 26, 2018, 8 pages.

*Primary Examiner* — Leo B Tentoni
(74) *Attorney, Agent, or Firm* — Cantor Colburn LLP

(57) ABSTRACT

Embodiments include techniques for determining the uniformity of a powder layer distribution, where the techniques include pre-heating a powder layer, scanning the powder layer, and receiving a signal from the powder layer. The techniques also include filtering the received signal, measuring a radiation intensity of the received signal over a range of wavelengths, and comparing the measured radiation intensity to a reference spectrum for the powder layer.

8 Claims, 2 Drawing Sheets

(51) Int. Cl.
   *B22F 3/105*   (2006.01)
   *G01J 5/60*    (2006.01)
   *G01J 5/00*    (2006.01)

(56) References Cited

U.S. PATENT DOCUMENTS

2008/0262659 A1    10/2008   Huskamp
2015/0165681 A1     6/2015   Fish et al.
2018/0143147 A1*    5/2018   Milner .................. B29C 64/153

FOREIGN PATENT DOCUMENTS

WO      2016123549 A1     4/2016
WO      2016183210 A1    11/2016
WO      2016201390 A1    12/2016

* cited by examiner

DETERMINING THE UNIFORMITY OF POWDER LAYER DISTRIBUTION ACROSS THE BUILD PLATE DURING A POWDER BED FUSION PROCESS

BACKGROUND

One or more embodiments pertain to the art of powder bed fusion process, in particular to a technique for determining the uniformity of powder layer distribution across a build plate during a powder bed fusion process.

Powder bed fusion processes are used in various technologies including additive manufacturing technologies such as 3D printing, rapid prototyping, direct digital manufacturing, layered manufacturing and additive fabrication. Some additive manufacturing techniques use a laser as the power source to melt or sinter the material in forming a final product during the process. This technology can fuse or bind small particles including plastics, metals, ceramics, and glass powders into a desired structure where the laser selectively fuses each of the powder layers according to a computer-aided design file and repeats the process until the final product is completely formed. The quality of the powders and the integrity of the binding of each layer can affect the characteristics of the final product.

BRIEF DESCRIPTION

Disclosed is a system for determining the uniformity of a powder layer distribution in accordance with one or more embodiments. The system includes a heat source for pre-heating a powder layer, and a camera system for scanning the powder layer, the camera system includes one or more lenses, one or more focal plane arrays, and one or more bandpass filters. The system also includes a processor for measuring a radiation intensity of a signal received from the powder layer, over a range of wavelengths, and comparing the measured radiation intensity to a reference spectrum for the powder layer.

Also disclosed is method for determining the uniformity of powder layer distribution in accordance one or more embodiments. The method includes pre-heating a powder layer, scanning the powder layer, and receiving a signal from the powder layer. The method also includes filtering the received signal, measuring a radiation intensity of the signal over a range of wavelengths, and comparing the measured radiation intensity to a reference spectrum for the powder layer.

BRIEF DESCRIPTION OF THE DRAWINGS

The following descriptions should not be considered limiting in any way. With reference to the accompanying drawings, like elements are numbered alike.

DETAILED DESCRIPTION

Currently, there are no definitive techniques to quantitatively determine the uniformity of powder layer distribution across the build plate. The uniformity of the powder layer directly affects the overall quality of the final product being built. The characteristics that can be affected by the uniformity include the final product's surface roughness, material homogeneity, porosity, etc. In addition, defects such as inter-layer delamination, inclusions, voids, over-melt/under-melt, etc. can occur without detection. The techniques described herein are focused on determining the uniformity of a powder layer distribution of a build plate.

A detailed description of one or more embodiments of the disclosed apparatus and method are presented herein by way of exemplification and not limitation with reference to the Figures.

Figure 1:
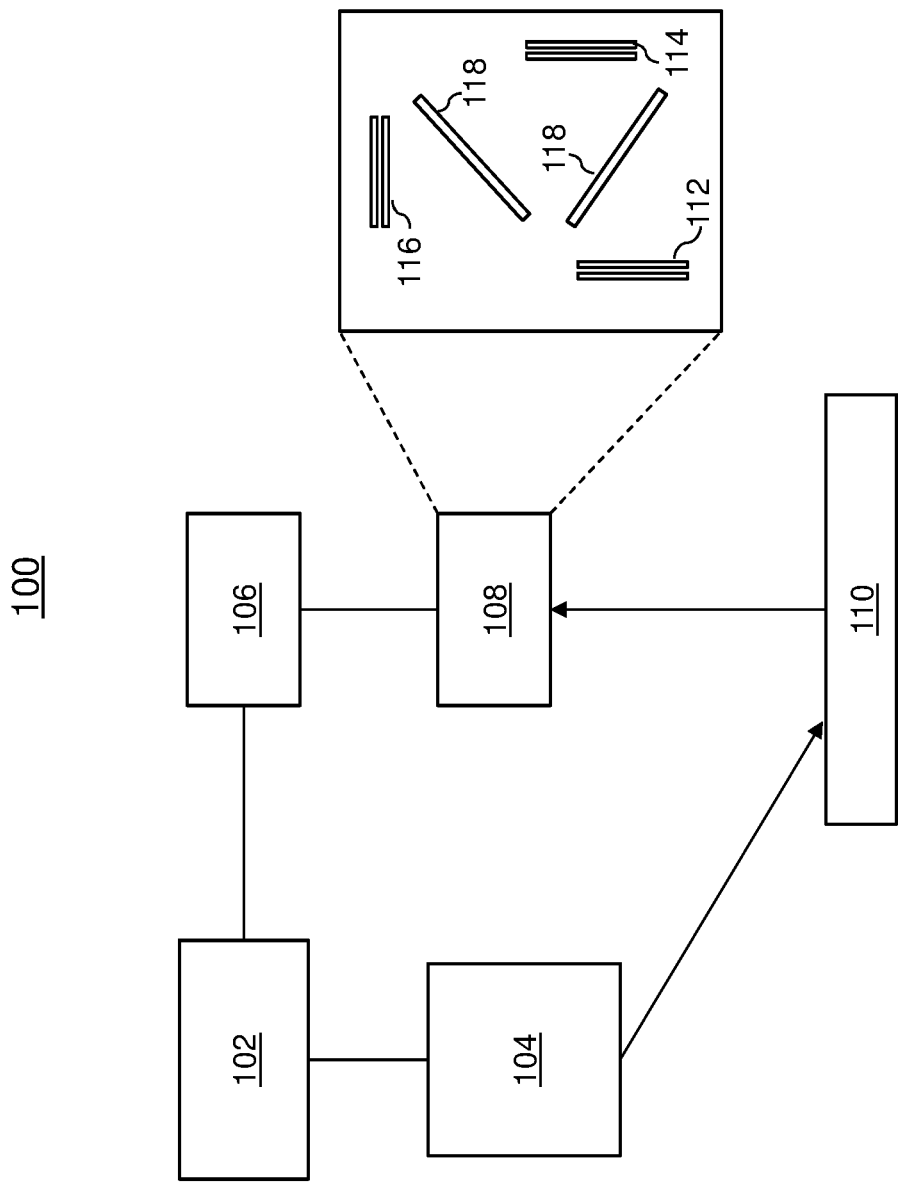
FIG. 1 depicts a system for determining the uniformity of powder layer distribution in accordance with one or more embodiments.

Now referring to FIG. 1, a system 100 for determining the uniformity of a powder layer distribution in accordance with one or more embodiments is shown. The system 100 includes a processor 102. In one or more embodiments, the processor 102 is a data acquisition (DAQ) and image processor. The processor 102 is coupled to the heat source 104. The heat source 104 is used to pre-heat the powder bed 110 for scanning the characteristics of the powder placed on the powder bed 110. The powder layer emits thermal radiation when heated, and the powder layer also reflects incidental thermal infrared radiation to the camera system. The emission and reflection spectrum of the powder layer is known to be dependent upon the powder material layer thickness, powder particle size and distribution, packing density, and surface morphology.

The processor 102 is also coupled to a camera controller 106 which is configured to control the camera system 108. In one or more embodiments, the camera system 108 can include one or more bandpass filters 118. After the powder layer is pre-heated, the thermal radiation emitted from the powder layer is scanned by the camera system 108. In one scenario, the thermal radiation signal is split into three or more wavelength ranges using the bandpass filters 118. The wavelength ranges can include but are not limited to Near infrared (NIR)=0.75-1.4 µm; Short-wavelength infrared (SWIR)=1.4-3 µm; Long-wavelength infrared (LWIR)=3-8 µm; and Far infrared (FIR)=15-1000 µm. In addition, the camera system 108 can include one or more lens and focal plane arrays (FPA) 112, 114, and 116. In an embodiment, the thermal radiation signal is received by the camera system 108 and is reflected by one or more bandpass filters 118 so that the lights rays are transmitted through the non-reflective coated lenses and FPAs 112, 114, and 116. The FPAs are sensitive to particular wavelength bands of light (SWIR, MWIR, and LWIR). In one or more embodiments, any combination of the above types of filters can be used together in the system.

The heat source 104 and the camera system 108 are controlled by the processor 102. In one or more embodiments, the processor 102 uses spectral angle mapping to process the multispectral images and convert multispectral images into a two-dimensional signature map of the powder bed 108.

In one or more embodiments the spectral angle, $\Delta\alpha$, is the inner product, or correlation coefficient between the test spectrum intensity versus wavelength $I_0(l)$ and the reference spectrum, where $I(l)$ is the intensity and $l$ is the wavelength. The spectral angle, $\Delta\alpha$, can be calculated by the following equation:

$$\cos\Delta\alpha = \frac{\sum_{i=1}^{n} I_0(\lambda_i) I_t(\lambda_i)}{\sqrt{\left(\sum_{i=1}^{n} I_0^2(\lambda_i)\right)\left(\sum_{i=1}^{n} I_t^2(\lambda_i)\right)}}$$

In an embodiment, small angles (Δα) between two spectra can indicate a high similarity between them, and high angles (Δα) can indicate low similarity. This technique is not affected by illumination factors because the angle between the vectors is not dependent on the vector magnitude. Therefore, this technique is not affected by the temperature, shadows, etc.

In one or more embodiments, any combination of the above types of filters can be used together in the system. In one or more embodiments, the system can coupled to other sensor and process monitoring systems to collect data associated with the process. The data can be collected in real-time or non-real-time. In one or more embodiments, the system can use a multi-spectral (hyper-spectral imaging) infrared or microwave imaging system to scan the powder layer recoated across a build plate.

In one or more embodiments, the camera system 108 can include one or more cameras. In addition, the cameras can be infrared cameras that are sensitive to radiation over different wavelength bands. In other embodiments, a spectrometer can be used to measure radiation intensity against wavelengths at each pixel or focal point of the powder bed.

The intensity spectrum is used to accurately calculate the temperature of the different regions of an area emitting radiation. Also, multispectral sensing can collect other additional information from the surface that is emitting the radiation. Multispectral sensing provides a technique to distinguish between various materials based on their emissive and reflective properties of the surface layer of the respective materials.

The results of the multispectral spectral analysis performed on the powder layer can be compared to reference information, where the results can be used to dynamically modify a fusion process to increase the quality of the build. As a non-limiting example, the feedback can be used to optimize and control the laser power, scan speed, residence time, scanning strategy, etc., of the additive manufacturing build process. In another embodiment, the data that has been received from the powder bed layer can be used to match a powder coupon that is stored. The match can be determined based on the closest matching profile between the scanned powder layer and the stored powder layer. The system can be configured to identify sources of error and phenomenon that can lead to defects, porosity, poor part quality, and failure. The system ensures that all aspects of the additive manufacturing process are in control.

Figure 2:
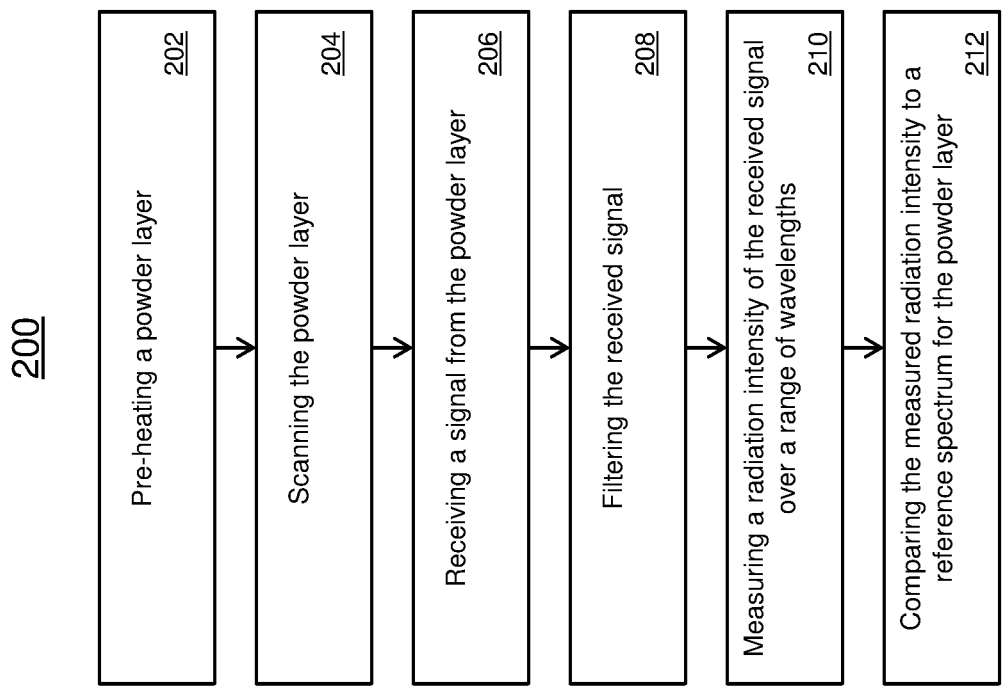
FIG. 2 depicts a method for determining the uniformity of powder layer distribution in accordance with one or more embodiments.

Now referring to FIG. 2, a method 200 for determining the uniformity of a powder layer distribution in accordance with one or more embodiments is shown. Block 202 provides pre-heating a powder layer. In one or more embodiments, the powder layer is pre-heated using a heat source such as a heat lamp. The heat source heats up the powder bed to a uniform temperature where the powder bed will emit thermal radiation.

Block 204 provides scanning the powder layer. In one or more embodiments, a camera system performs a scan of the powder layer. Block 206 provides receiving a signal from the powder layer. In one or more embodiments, the camera system is configured to receive the thermal radiation reflected from the heated powder layer.

Block 208 provides filtering the received signal. In one or more embodiments, the camera system is configured to filter the received thermal radiation from the powder layer. The camera system includes one or more bandpass filters to separate the radiation into different wavelength ranges to be analyzed.

Block 210 provides measuring a radiation intensity of the signal over a range of wavelengths. In one or more embodiments, the camera system and heat lamp are controlled by a digital data acquisition and control system that processes the scanned thermal images. In addition, the information that is obtained from the scan can be used to control an additive manufacturing system. In an embodiment, the DAQ and the image processor uses a spectral angle mapping technique to automatically processes the multispectral image and convert them to a two-dimensional signature map of the powder bed.

Block 212 provides comparing the measured radiation intensity to a reference spectrum. In one or more embodiments, the thermal images for each pixel of the thermal image of the powder bed are compared against a library of powder bed images. The results of the comparison can provide information about the characteristics of the powder bed. The library of powder coupons can be determined in a variety of ways. In one embodiment, the library can be generated by pre-scanning images of powder layers with known material properties. In another embodiment, the powder coupons can be scanned with the same multispectral system, or with a spectrometer, or sequentially by a sequence of monochromatic images of the powder coupons, in order to generate a characteristic spectrum (intensity versus wavelength) for each coupon.

In one or more embodiments, the techniques described herein can be utilized with metallic and non-metallic powders that are used for additive manufacturing powder bed fusion processes.

In one or more embodiments, electromagnetic radiation is emitted by or reflected off of a powder bed to provide quantified information about the powder layer that can be used to optimize the laser power, scan speed, residence time, scanning strategy, etc., during an additive manufacturing build process. In one or more embodiments, the monitoring of the powder layer occurs during an additive manufacturing process. The monitoring allows the current process to be modified to increase the quality of the build.

The techniques described herein can be used to optimize an additive manufacturing process and/or system. The information can be transmitted to an external system to control the quality of the product during manufacturing as opposed performing a quality check after each the final product has been completely manufactured. In addition, the efficiency of additive manufacturing production can be increased by correcting issues based on the current condition of the powder and configuration of the additive manufacturing system. The configuration of the system can be quickly detected and the performance of the system can be monitored.

The techniques described herein provide a method for quantitatively evaluating the quality of new powder lots and recycled powders. In addition, the techniques provide a method for providing a permanent record for production quality assurance.

Other techniques include using a single wavelength thermography, where an infrared (IR) camera generates a 2D image derived from the radiation intensity at each pixel, which is converted to temperature. The 2D analysis does not provide information about powder thickness uniformity, powder packing number or powder density distribution. However, a multi-spectral sensing technique, which is described herein, provides a more accurate calculation for temperature. The information obtained from the multi-spectral sensing technique can be used to optimize the powder bed fusion process. The techniques described herein also provide an in-process monitoring and closed loop control for managing an additive manufacturing process.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for determining the uniformity of powder layer distribution, the method comprising:

pre-heating a powder layer;
   scanning the powder layer;
   receiving a signal from the powder layer;
   filtering the received signal;
   measuring a radiation intensity of the signal over a range of wavelengths;
   comparing the measured radiation intensity to a reference spectrum for the powder layer; and
   responsive to the scanning, matching the powder layer to a stored powder layer coupon.

2. The computer-implemented method of claim 1, wherein results of the comparing are transmitted to an additive manufacturing system.

3. The computer-implemented method of claim 1, wherein filter and the measuring uses one or more focal plane arrays including different types of focal plane arrays comprising at least one of a near infrared, a short-wavelength infrared, a long-wavelength infrared or a far infrared type.

4. The computer-implemented method of claim 1, wherein the comparing includes comparing each pixel of the received signal to the reference spectrum for the powder layer.

5. The computer-implemented method of claim 1, further comprises generating a library of powder coupons by pre-scanning images of powder layers.

6. The computer-implemented method of claim 1, further comprises converting a multispectral image of the powder layer to a two-dimensional signature map of the powder layer.

7. The computer-implemented method of claim 1, wherein the filtering uses three or more types of focal plane arrays.

8. The computer-implemented method of claim 1, further comprises monitoring the powder layer during an additive manufacturing process.

* * * * *